(12) United States Patent
Reverberi et al.

(10) Patent No.: US 7,281,903 B2
(45) Date of Patent: Oct. 16, 2007

(54) DEVICE FOR VARYING THE PRESSURE OF THE FLUID DELIVERED BY A JET WASHER

(75) Inventors: Stefano Reverberi, Modena (IT); Fabrizio Fabbri, Modena (IT); Alessandro Casalgrandi, Modena (IT)

(73) Assignee: Annovi Reverberi S.p.A, Modena (IT)

( * ) Notice: Subject to any disclaimer, the term of this patent is extended or adjusted under 35 U.S.C. 154(b) by 349 days.

(21) Appl. No.: 10/456,533

(22) Filed: Jun. 9, 2003

(65) Prior Publication Data

US 2004/0016821 A1   Jan. 29, 2004

(30) Foreign Application Priority Data

Jul. 25, 2002  (IT) ............ RE20020023 U

(51) Int. Cl.
F04B 49/06   (2006.01)
(52) U.S. Cl. ........................ 417/44.1; 417/45
(58) Field of Classification Search .......... 417/44.1, 417/45, 12, 415, 44.11
See application file for complete search history.

(56) References Cited

U.S. PATENT DOCUMENTS

| | | | | |
|---|---|---|---|---|
| 3,575,348 A | * | 4/1971 | MacKay .................. 239/127 |
| 3,675,851 A | * | 7/1972 | Merfeld et al. ............ 239/318 |
| 3,940,065 A | * | 2/1976 | Ware et al. ................ 239/146 |
| 4,004,412 A | * | 1/1977 | Burnell .................. 60/39.281 |
| 4,153,968 A | * | 5/1979 | Perkins ..................... 15/321 |
| 4,208,871 A | * | 6/1980 | Riple, Jr. ................ 60/39.281 |
| 4,311,190 A | * | 1/1982 | Walley .................... 165/265 |
| 4,485,623 A | * | 12/1984 | Chichester et al. ......... 60/422 |
| 4,505,169 A | * | 3/1985 | Ganoung .................. 477/100 |
| 4,665,698 A | * | 5/1987 | Trusock .................... 60/422 |
| 4,715,786 A | * | 12/1987 | Wolff et al. ................ 417/22 |
| 4,770,168 A | * | 9/1988 | Rusz et al. ............. 128/203.12 |
| 4,815,278 A | * | 3/1989 | White ................... 60/39.281 |
| 4,891,562 A | * | 1/1990 | Nuckolls et al. ............ 315/277 |
| 5,099,543 A | * | 3/1992 | Wade ........................ 15/321 |
| 5,238,191 A | * | 8/1993 | Gaymon .................... 239/526 |
| 5,383,605 A | * | 1/1995 | Teague ..................... 239/526 |
| 5,386,940 A | * | 2/1995 | Berfield .................... 239/394 |
| 5,407,134 A | * | 4/1995 | Thompson et al. ......... 239/156 |
| 5,421,520 A | * | 6/1995 | Simonette et al. ......... 239/525 |
| 5,584,094 A | * | 12/1996 | Gurstein .................... 15/321 |
| 5,592,979 A | * | 1/1997 | Payne et al. ................ 141/59 |
| 5,635,689 A | * | 6/1997 | Shepard et al. ............ 187/292 |
| 5,667,362 A | * | 9/1997 | Murai et al. ................. 417/41 |
| 5,868,175 A | * | 2/1999 | Duff et al. .................. 141/59 |
| 6,045,333 A | * | 4/2000 | Breit ...................... 417/44.1 |
| 6,074,170 A | * | 6/2000 | Bert et al. ................ 417/44.2 |
| 6,204,627 B1 | * | 3/2001 | Watanabe et al. .......... 318/729 |

(Continued)

FOREIGN PATENT DOCUMENTS

EP    1384529 A2 *  1/2004

(Continued)

Primary Examiner—William H. Rodriguez
(74) Attorney, Agent, or Firm—Browdy and Neimark, PLLC

(57) ABSTRACT

Device for varying the delivery pressure of a jet washer comprising a positive-displacement pump operated by a single-phase electric motor powered by alternating current and having a delivery nozzle of predetermined cross-section, and electronic means for controlling and regulating the motor feed voltage to vary its speed of rotation.

7 Claims, 3 Drawing Sheets

U.S. PATENT DOCUMENTS

| | | | |
|---|---|---|---|
| 6,227,807 B1 * | 5/2001 | Chase | 417/44.1 |
| 6,400,119 B1 * | 6/2002 | Garza et al. | 318/798 |
| 6,571,805 B2 * | 6/2003 | Hoenisch et al. | 134/22.12 |
| 6,652,239 B2 * | 11/2003 | Carstensen | 417/44.11 |
| 6,712,906 B2 * | 3/2004 | Estelle et al. | 118/683 |
| 6,945,261 B2 * | 9/2005 | Wadsworth et al. | 134/95.3 |
| 2001/0003563 A1 * | 6/2001 | Schauer et al. | 401/5 |
| 2002/0197166 A1 * | 12/2002 | Carstensen | 417/44.1 |
| 2003/0101931 A1 * | 6/2003 | Estelle et al. | 118/300 |
| 2003/0138327 A1 * | 7/2003 | Jones et al. | 417/42 |
| 2004/0055363 A1 * | 3/2004 | Bristol | 73/31.03 |
| 2005/0156060 A1 * | 7/2005 | Attar | 239/332 |
| 2005/0189437 A1 * | 9/2005 | Alexander et al. | 239/332 |
| 2005/0189904 A1 * | 9/2005 | Willis et al. | 318/812 |

FOREIGN PATENT DOCUMENTS

JP    2004-60654    *    2/2004

* cited by examiner

DEVICE FOR VARYING THE PRESSURE OF THE FLUID DELIVERED BY A JET WASHER

BACKGROUND OF THE INVENTION

1. Field of the Invention

This invention relates to a system for controlling the pressure of the fluid delivered by those high pressure pumps known as jet washers, and in particular those using a positive-displacement pump.

2. Prior Art

In jet washers of known type the pressure of the fluid delivered by the pump is regulated by mechanical systems associated either with the pump or with the gun which delivers the pressurized fluid. In both types of system the pressure is regulated downstream of the pump, which always delivers the maximum fluid flow rate, hence the pressure regulation dissipates hydraulic energy provided by the pump.

From the a foregoing it is apparent that in systems of known type there is an unnecessary wastage of hydraulic energy, and consequently of electrical energy absorbed by the motor to operate the pump, hence in the final analysis there is an excessive power consumption by the electric motor operating the pump. An object of this invention is to overcome the drawbacks of the known art within the context of a simple, rational and low-cost solution.

OBJECT AND SUMMARY OF THE INVENTION

The invention attains this and other objects by providing a system for regulating the delivered fluid pressure in the basis of the r.p.m. of the electric motor operating the positive-displacement pump.

Said system hence comprises electronic control means for the voltage supplied to the electric motor operating the positive-displacement pump.

According to a first embodiment of the invention said electronic means comprise at least one diode connected into the motor feed phase conductor.

By connecting said diode, the waveform of the feed voltage is modified, to become half-wave. This enables the motor speed and consequently the speed of the positive-displacement pump associated with the motor to be varied. In this manner the delivered fluid pressure, for equal delivery nozzle cross-sections, varies with the fluid flow rate Q, and hence as the flow rate is a function of the motor speed, by varying this latter the delivered fluid pressure also varies.

This first embodiment of the invention enables the motor speed and hence the fluid delivery pressure to be varied to only a small extent. In contrast, a second embodiment of the invention enables the pressure to be regulated continuously as a function of the motor speed. According to said second embodiment, the electronic means for controlling the feed voltage to the pump operating motor comprises a triac connected into the feed line to the motor, it being triggered by a pilot circuit comprising a potentiometer adjustable by the user. By adjusting the potentiometer the user varies the triac triggering voltage and hence the waveform of the electric motor feed voltage. The triac is extinguished when the voltage is zero.

From the a foregoing description it will be noted that the system of the invention offers the advantage of better motor and pump utilization in that these are commanded to deliver only the power necessary to deliver the fluid at the pressure desired by the user. By using the invention, hydraulic energy is not dissipated as in the systems of the known art.

The particular characteristics of the invention are defined in the claims.

BRIEF DESCRIPTION OF THE INVENTION

The constructional and functional characteristics of the invention will be more apparent from the description of a preferred embodiment thereof given hereinafter by way of non-limiting example and illustrated in the accompanying drawings.

DETAILED DESCRIPTION OF THE PREFERRED EMBODIMENTS OF THE INVENTION

Figure 1:
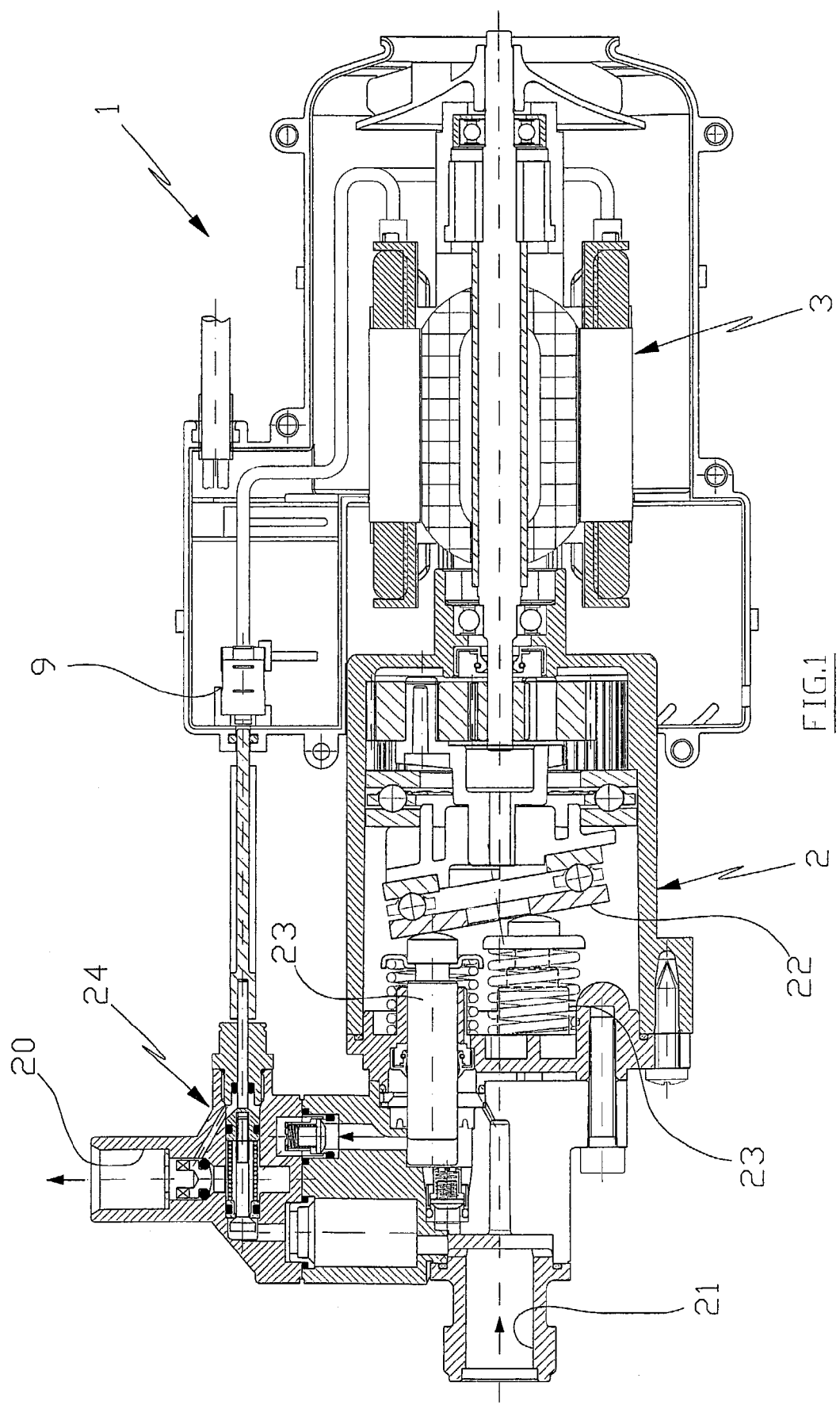
FIG. 1 is a section taken on a vertical plane through a pump with which the invention is associated.
Figure 2:
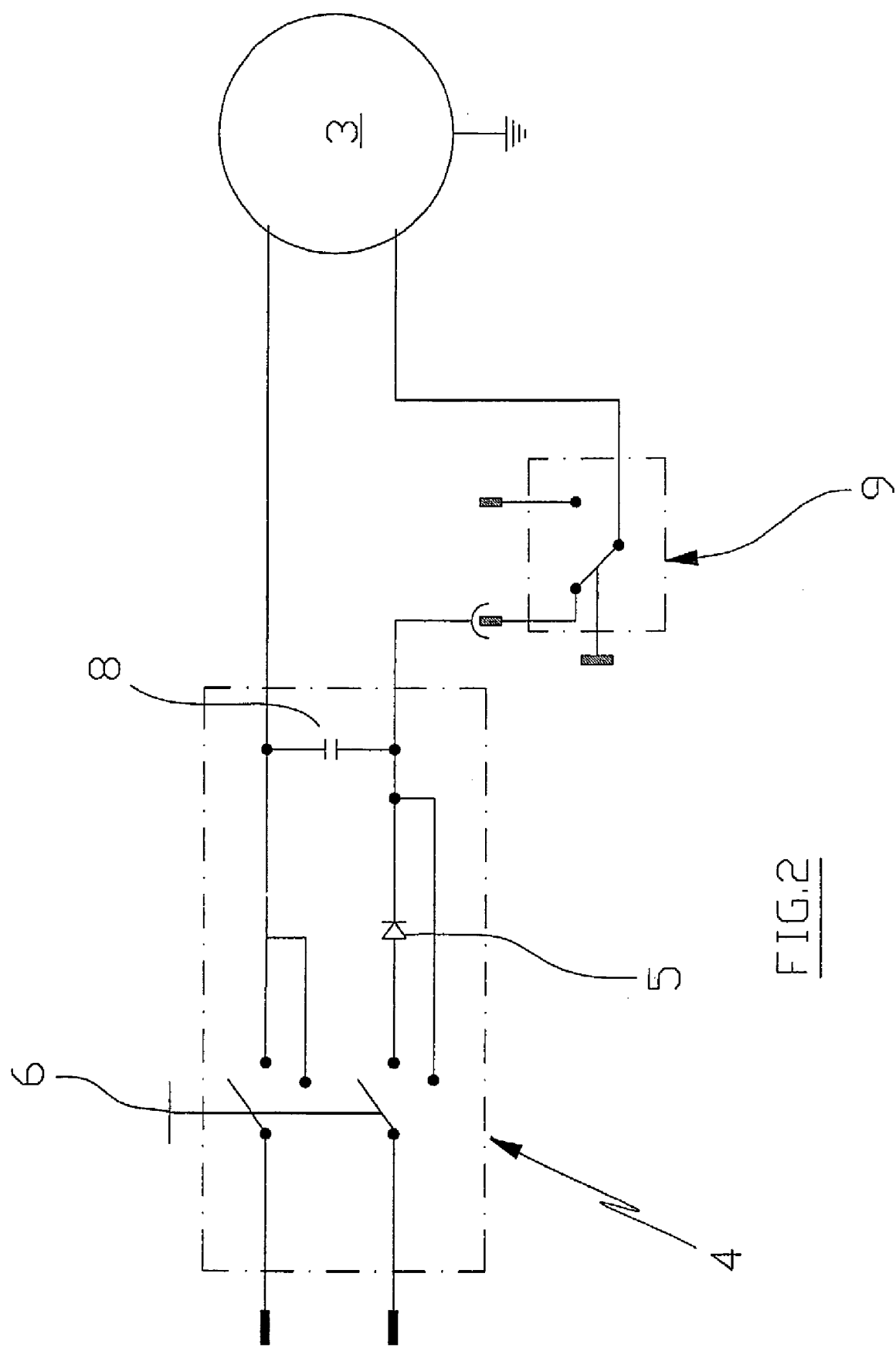
FIG. 2 shows a simplified electrical scheme of a first embodiment of the invention.
Figure 3:
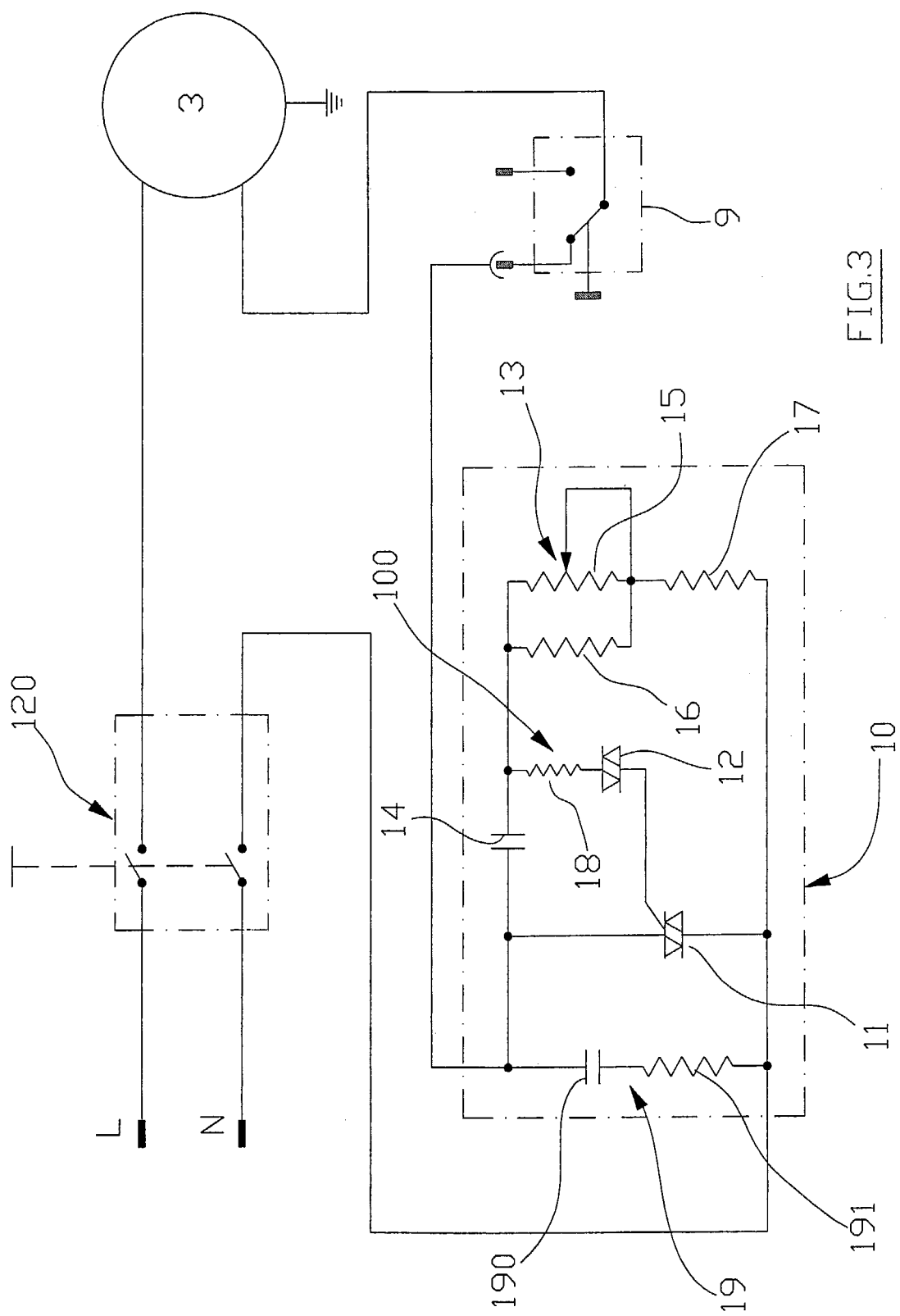
FIG. 3 shows the electrical scheme of a second embodiment of the invention.

FIGS. 1-3 show a jet washer 1, comprising a positive-displacement pump 2 provided with a pressurized fluid delivery conduit 20 connected to a delivery gun, not shown, and with a fluid intake conduit 21 connected to a supply source, not shown.

The positive-displacement pump 2, which is of known type operated by an electric motor 3, comprises an inclined rotary plate 22 arranged to operate three angularly equidistant pistons 23, two of which are visible in FIG. 1.

On the pump delivery conduit there is mounted the usual device 24 for interrupting motor operation when the user halts fluid delivery by releasing the gun operating trigger.

The electric motor 3 operating the pump 2 is of single phase alternating current brush type and is controlled by electronic means 4 enabling the pump rotational speed to be controlled.

Controlling the pump rotational speed regulates the pressure of the fluid delivered by the jet washer and hence the delivered fluid flow rate.

With reference to FIG. 2, which shows a first embodiment of the invention, said electronic means comprise a diode 5 which can be connected into the motor feed circuit by a selector switch 6.

Specifically, the diode is connected into the neutral conductor N, into which, downstream of the diode, there is also connected a micro-controller 7 controlled by the device 24. The circuit also comprises a capacitive filter 8.

When the motor is powered via the diode 5 the waveform of the feed voltage becomes half-wave, causing the r.p.m. of the motor and of the positive-displacement pump associated with the motor to decrease. As a result the pressure of the fluid delivered by the pump falls.

As will be apparent from the description, this first embodiment of the invention enables the pressure of the fluid delivered by the pump 2 to be reduced only to a predefined value which depends on the r.p.m. of the motor powered by the voltage half wave.

A second embodiment of the invention, shown in FIG. 3, enables the user to continuously regulate the pressure of the fluid delivered by the pump. This regulation is achieved by motor control means 10, which comprise a triac 11, triggered by a pilot circuit 100.

Said pilot circuit 100 comprises a diac 12, the conduction or inhibition state of which is piloted by a timer circuit 13.

The timer circuit 13 is connected in parallel with the triac 11 and comprises a capacitor 14, a potentiometer 15 with a parallel resistor 16, and a further resistor 17.

One of the terminals of the diac 12 is connected to the gate of the triac 11, the other to a resistor 18 connected between the capacitor 14 and the potentiometer 15.

To regulate the pressure to the desired value, the user firstly switches on the jet washer by means of the switch 120, then adjusts the potentiometer to vary the charge time of the capacitor 14. The capacitor charges until the voltage across its ends equals the triggering voltage of the diac 12. On attaining this value the diac 12 conducts to trigger the triac 11.

Consequently by adjusting the potentiometer, the triggering of the triac can be delayed, to hence regulate, for each period, the powering time of the motor 3.

It should be noted that in parallel with the triac 11 there is connected an ohmic-capacitive filter 19, comprising a capacitor 190 with a resistor 191 in series.

The invention claimed is:

1. A jet washer comprising a positive-displacement pump operated by a single-phase electric motor powered by alternating current through a feed circuit and having a pressurized fluid delivery conduit and an electronic device which controls and regulates the delivered pressure of said pressurized fluid by regulating the motor feed voltage so as to vary the motor's speed of rotation by varying the waveform of the electric motor feed voltage, wherein said electronic device comprises at least one diode and at least one selector switch for connecting said diode into the motor feed circuit.

2. The jet washer as claimed in claim 1, characterised by comprising at least one capacitive filter.

3. A jet washer comprising a positive-displacement pump operated by a single-phase electric motor powered by alternating current through a feed circuit and having a pressurized fluid delivery conduit and an electronic device operated by a user which controls and regulates the delivered pressure of said pressurized fluid by regulating the motor feed voltage so as to vary the motor's speed of rotation by varying the waveform of the electric motor feed voltage, wherein said electronic device comprises at least one triac, the triggering of which is controlled by a pilot circuit.

4. The jet washer as claimed in claim 3, characterised in that said pilot circuit comprises a diac, the inhibition or conduction state of which is controlled by a timer circuit.

5. The jet washer as claimed in claim 4, characterised in that said timer circuit comprises at least one potentiometer.

6. The jet washer as claimed in claim 4, characterised in that said potentiometer can be adjusted by the user on the basis of the desired pressure of the fluid delivered by the pump.

7. The jet washer as claimed in claim 3, characterised by comprising at least one ohmic-capacitive filter.

\* \* \* \* \*